United States Patent
Chang et al.

(10) Patent No.: US 8,805,089 B2
(45) Date of Patent: *Aug. 12, 2014

(54) MOVING INFORMATION BETWEEN COMPUTING DEVICES

(75) Inventors: Tsung-Hsiang Chang, Cambridge, MA (US); Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/234,953

(22) Filed: Sep. 16, 2011

(65) Prior Publication Data

US 2012/0069199 A1    Mar. 22, 2012

Related U.S. Application Data

(60) Provisional application No. 61/384,075, filed on Sep. 17, 2010.

(51) Int. Cl.
*G06K 9/00* (2006.01)
*G06F 7/00* (2006.01)
*G06F 15/16* (2006.01)
*G06F 15/167* (2006.01)

(52) U.S. Cl.
USPC .......... 382/218; 382/100; 707/617; 709/201; 709/212

(58) Field of Classification Search
USPC .......... 382/100, 103, 218; 719/312, 329; 707/609, 610, 617, 621, 999.008, 707/999.201, 999.202, E17.007; 710/304; 713/232; 361/679.4; 709/201, 212, 709/230; 715/209, 715, 796; 345/173; 348/207.1

See application file for complete search history.

(56) References Cited

U.S. PATENT DOCUMENTS

| | | | |
|---|---|---|---|
| 5,752,254 A | 5/1998 | Sakairi | |
| 6,324,544 B1 | 11/2001 | Alam et al. | |
| 7,096,299 B2 | 8/2006 | Meynard | |
| 7,162,543 B2 | 1/2007 | Fischer et al. | |
| 7,209,949 B2 | 4/2007 | Mousseau et al. | |
| 7,620,658 B2 | 11/2009 | Benson et al. | |
| 7,659,885 B2 | 2/2010 | Kraus et al. | |
| 7,831,679 B2 * | 11/2010 | Apacible et al. | 709/209 |
| 7,899,779 B1 | 3/2011 | Oganesyan | |
| 8,244,043 B2 * | 8/2012 | Chang et al. | 382/218 |

(Continued)

FOREIGN PATENT DOCUMENTS

WO    WO2008/137432    11/2008

OTHER PUBLICATIONS

Authorized Officer O. Aviles Parrales. International Search Report and Written Opinion in international application No. PCT/US2011/051989, dated Jan. 24, 2012, 9 pages.

(Continued)

*Primary Examiner* — Sheela Chawan
(74) *Attorney, Agent, or Firm* — Fish & Richardson P.C.

(57) ABSTRACT

A computer-implemented method for moving information between computing devices includes capturing a digital image of a display of a first computing device using a camera of a second computing device, transmitting, to the first computing device, data that corresponds to the digital image; analyzing the transmitted data on the first computing device to determine whether the digital image matches a current display of the first computing device, and using the analysis to cause one of the first or second computing devices to invoke an application and match a state of an application that is executing on the other of the first or second computing devices.

22 Claims, 11 Drawing Sheets

(56) References Cited

U.S. PATENT DOCUMENTS

| | | | |
|---|---|---|---|
| 2005/0099403 | A1 | 5/2005 | Kraus et al. |
| 2006/0036585 | A1 | 2/2006 | King et al. |
| 2007/0199076 | A1 | 8/2007 | Rensin et al. |
| 2008/0052181 | A1 | 2/2008 | Devitt-Carolan et al. |
| 2008/0120555 | A1 | 5/2008 | Mcmahan et al. |
| 2008/0307102 | A1 | 12/2008 | Galloway et al. |
| 2009/0202114 | A1* | 8/2009 | Morin et al. ............... 382/118 |
| 2009/0235187 | A1* | 9/2009 | Kim et al. ............... 715/760 |
| 2010/0083012 | A1* | 4/2010 | Corbridge et al. ............ 713/300 |
| 2010/0217837 | A1 | 8/2010 | Ansari et al. |
| 2011/0004888 | A1 | 1/2011 | Srinivasan et al. |

OTHER PUBLICATIONS

"Chrometophone—Google Chrome to Phone Extension" Retrieved from the Internet: http://code.google.com/p/chrometophone/ (2011) 1 page.

"Google Chrome to Phone Extension—Chrome Web Store" Retrieved from the Internet: https://chrome.google.com/webstore/detail/oadboiipflhobonjjffjbfekfjcgkhco (2011) 2 pages.

"Android Tapp. Android App Reviews, Android Apps, News, App Recommendations & Interviews" Retrieved from the Internet: http://www.androidtapp.com/google-chrome-to-phone/ (Aug. 12, 2010) 14 pages.

Jason Chen "Google Chrome to Phone Connects Your Desktop to Your Android" Retrieved from the Internet: http://gizmodo.com/5611400/google-chrome-to-phone-corrects-your-desktop-to-your-android (Aug. 12, 2010) 3 pages.

Rekimoto, J. Pick-and drop: a direct manipulation technique for multiple computer environments *UIST* (1997) 9 pages.

Pierce, J.S. and Nichols, J. "An Infrastructure for Extending Applications" User Experiences Across Multiple Personal Devices. *UIST* (2008), pp. 101-111.

Miller, R.C. et al. Synchronizing Clipboards of Multiple Computers, *UIST* (1999).

Rekimoto "Augmented Surfaces: A Spatially Continuous Work Space for Hybrid Computing Environments" CHI'99, pp. 378-385.

Herbert, et al. "SURF: Speeded Up Robust Features", Computer Vision and Image Understanding *CVIU*, vol. 110, No. 3, pp. 346-359 (2007).

International Preliminary Report on Patentability in International Application No. PCT/US2011/051989, issued Mar. 19, 2013, 6 pages.

* cited by examiner

MOVING INFORMATION BETWEEN COMPUTING DEVICES

CROSS-REFERENCE TO RELATED APPLICATIONS

This application claims priority under 35 U.S.C. §119(e)(1), to U.S. Provisional Application Ser. No. 61/384,075, filed on Sep. 17, 2010, the entire contents of which are incorporated herein.

TECHNICAL FIELD

This document relates to systems and techniques for moving data from one computing device to one or more other computing devices.

BACKGROUND

Many people now own a number of different computers, from a desktop or laptop computer at work or home, to a tablet or slate for reviewing digital content, to a smartphone for mobile computing and communications. Computer users transition frequently between these devices, for example, leaving their personal computer in their office during lunch and carrying their smartphone with them.

At times, a computer user may want to move information from one device onto another device. For example, a computer user may employ the power and convenience of her desktop computer to type in the address of an upcoming travel destination and to get directions to the destination. To make the information mobile, the user can print the directions and carry them along on the trip. The user may also take a picture of the desktop computer's screen, and look at the image of the map captured in the picture as need be on her mobile device display. Alternatively, the user could copy a Uniform Resource Locator (URL) for a map from a browser, paste the URL into an email to himself or herself, send the email, and then open the email with his or her mobile device and select the hyperlink for the URL.

SUMMARY

This document describes systems and techniques that provide mechanisms for moving information conveniently between computing devices. The information may be the current state of an application on a first computer, so that the state can be duplicated automatically on a second computer. In one such example, a user who wants to duplicate or approximate a part of a state of another computer may capture an image of the display of the other computer, such as by using a camera on her smartphone. For example, the user may have employed her desktop computer to generate driving directions from her own office to an office of a colleague, and may want a corresponding mapping application to open on her smartphone so that she can carry the directions with her during her drive to the colleague's office. The techniques described here may cause the captured image to be sent to each of the other active (logged in) devices that are assigned to the user, and those devices may compare the image to their respective current displays (because one of them will be displaying the original display that is in the captured image) in order to determine if they are the intended target of the information sharing request. The device that determines it is the target may then converse with the relevant application to obtain information about the state of the application, such as a Uniform Resource Identifier (URI) from a web browser or other forms of information that may be defined by an application programming interface (API) for the system. Such information may then be sent back to the smartphone, which may then cause a corresponding application to be made active and to match the state of the application on the computer. In one implementation, this process is known as deep shooting, or "Deep Shot," because it allows the initiating or initial device to obtain, not only the image, but also the underlying state data so that it can open an actual functioning application with which the user can interact.

An inverse procedure may be used to post state information from the device that has a camera to another device. In particular, the initiating device (e.g., a smartphone) may capture an image of the target device, and may send that image to all devices that are logged into the user's account (or that are otherwise related to each other in some defined manner). The initiating device may include, along with the image, information about its own state, such as a URI of an application that is the current focus of the initiating device (and it may overlay an image of the application on the image from the camera when the user is taking the picture, so as to clarify for the user the information that will be sent to the other devices). Each of the other devices may then determine whether they are the device in the image, and the device that determines it is the device in the image may launch the relevant application that is identified in the additional information from the initiating device, and may set the state of that application to the state identified in the additional information. Such an implementation may be referred to as "deep posting," in contrast to the "deep shooting" of the first example.

Referring to the mapping example, the user can capture an image of the user's desktop computer and may send that image from the user's smartphone to the desktop computer (and to other devices that belong to the user and are logged in) along with state information from the smartphone browser. The desktop computer can then determine that it is shown in the image and can open its corresponding application and provide it with the received state information. Where the application is a browser, the information may simply be a URI in the address bar of the browser, though additional information may be obtained from the browser when the URI does not fully describe the state of the application (e.g., when various AJAX techniques are used by the application).

Such identification of an executing application and state of the application may be carried out in one example, using text messaging techniques that permit TCP/IP communications between devices over the internet, while permitting relatively long message and rich content to be sent. One such example is the Extensible Messaging and Presence Protocol (XMPP), which has been implemented commercially as the Jabber product.

In other instances, image analysis can be used to identify the state of a device whose display has been captured in a digital image, such as by identifying text in an image using optical character recognition. For example, if a user captures an image of a map, the names of the towns that are displayed on the map may be identified, and those names may be used to identify the state of the application, such as by providing the names as search query terms for returning an area on the map. Subsequent steps may be taken to make a tighter match for the state of the application, such as by comparing a generated map to the image to make the zoom level proper. Image features in the image may also be compared with image features stored for a polarity of displays of computer applications.

In certain instances, the techniques discussed here can provide one or more advantages. For example, a user of a computing device can use her existing knowledge for operating a camera on the computer (which she may operate every day) to acquire an image of another computer. She can then coordinate or synchronize her smartphone to her computer or another person's computer automatically (though the synchronizing may be delayed, such as by the target computer sending a URI in a text message that the initial user must select in order to activate the captured state from the other computer). As a result, a user can share states between different ones of her computing devices or devices of other uses, and can then interact fully with the computer applications starting from those shared states. As a result, a user may have an improved experience in sharing information between computing devices.

In one implementation, a computer-implemented method for moving information between computing devices is disclosed. The method includes capturing a digital image of a display of a first computing device using a camera of a second computing device, transmitting, to the first computing device, data that corresponds to the digital image, analyzing the transmitted data on the first computing device to determine whether the digital image matches a current display of the first computing device, and using the analysis to cause one of the first or second computing devices to invoke an application and match a state of an application that is executing on the other of the first or second computing devices. The second computing device can provide, to the first computing device and with the digital image, state information about an application executing on the second computing device. Also, the second computing device can launch the application in a state that corresponds to the state information after determining that the digital image shows a current display of the first computing device.

In some aspects, the first computing device can determine whether it is shown in the digital image. Also, the first computing device can receive the digital image from the second computing device, and provide, in a responsive message to the second computing device, identification of an application running on the first computing device and a state of the application. Analyzing the transmitted data on the first computing device can include comparing a feature set from the transmitted data to a feature set from a current screen shot of the first computing device. The method can also include automatically transmitting the data that corresponds to the digital image to all devices that are registered with a messaging system to the user of the first computing device.

In another implementation, a computer-implemented method for moving information between computing devices is disclosed that includes obtaining a digital image of a display screen of a first computing device that is displaying a first application having a first state, where the digital image was acquired by a second computing device, analyzing the digital image to identify aspects of the display screen from the digital image and encoding those aspects as one or more parameters, identifying a currently operating application on the first computing device or on the second computing device, and a current state of the application, and providing data for causing the identified application to be activated on the other computing device on which the application was not operating, and for causing the application on the other computing device to enter a state that corresponds to identified current state. The digital image can be sent from the second computing device to the first computing device, and the second computing device can perform the analyzing of the digital image. The first computing device can also identify a currently operating application on the first computing device and provide an identifier for the application and a current state of the application to the first computing device. Also, the computing device can analyze the digital image to determine whether the first computing device is shown in the digital image. The first computing device can additionally activate the application based on a determination that the first computing device is shown in the digital image, and use state information received from the second computing device to establish a state of the activated application.

In some aspects, the first computing device can decline to activate an application on the first computing device based on a determination that the first computing device is not shown in the digital image. Also, analyzing the image can include determining whether a portion of the image matches a current video display of the first or second computing devices.

In some aspects, analyzing the digital image can include using optical character recognition to identify words, and identifying a currently operating application by using the words to select an application from multiple possible applications. Analyzing the digital image can include performing feature analysis on the digital image and comparing results of the feature analysis to results of feature analysis previously performed on images of known computer applications, where identifying a currently operating application comprises identifying a particular application that corresponds to a match in feature analysis results. In addition, providing data for causing the second computer to automatically display the first application in the first state can include sending a URI to the second computer, the URI corresponding to the first application and the first state. Moreover, the state can include a state of the first computing device accessing a hosted document stored at a computer server system, and providing the data for causing the identified application to be activated can include providing data that causes the second computing device to open an instance of the hosted document.

In yet another implementation, a computer-implemented system for moving information between computing devices is disclosed. The system includes a first computing device arranged to present one or more applications, each having a current state, on a display screen, a second computing device having a digital camera capable of capturing an image of the first computing device, and messaging interfaces on the first computing device and the second computing device to communicate messages through a network and central messaging service between the devices. One or more of the first and second computing devices is programmed, alone or in combination, to obtain data corresponding to a digital image of the display screen captured by the camera, to analyze the data to identify aspects of the display screen from the digital image, and to encode those aspects as one or more parameters, to identify a currently operating application on the first computing device or on the second computing device, and a current state of the application, and to provide data for causing the identified application to be activated on the other computing device on which the application was not operating, and for causing the application on the other computing device to enter a state that corresponds to identified current state.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

This document describes systems and techniques for capturing information about a current state of one computer and providing it so that a second computer can take the same or a similar state, along with other mechanisms for sharing information between computers using image capture techniques. In the examples discussed here, a camera on a computing device, initiating device or initial computer (e.g., a smartphone), can be used to capture an image of a display screen of another computer or target computer. That image may then be analyzed in order to identify what is occurring on the target computer, and to generate information that may be provided to the initial computer so that the state of the initial computer may match the state of the target computer in the picture. Such a match may be a total match, such as by determining all relevant state variables for the target computer, and emulating those variables on the initial computer. The match may also be an approximate match, such as where the target computer displays an area on a mapping application that substantially overlaps with the area in the captured image, but that may be moved somewhat or zoomed differently. The match may also be an associative match so that the state is modified to match a relative context of the second computer. For example, if a target computer has a document open and a first user of the target computer is editing the document, the initial computer may open the document simultaneously, but may display a cursor for a second user, displaying the cursor at a different location in the document. Thus, the state on the initial computer is similar to the state on the target computer in that both users are viewing the same document, but the state on the initial computer is different from the state on the target computer in that the view on each computer is customized for each of the users.

Figure 1A:
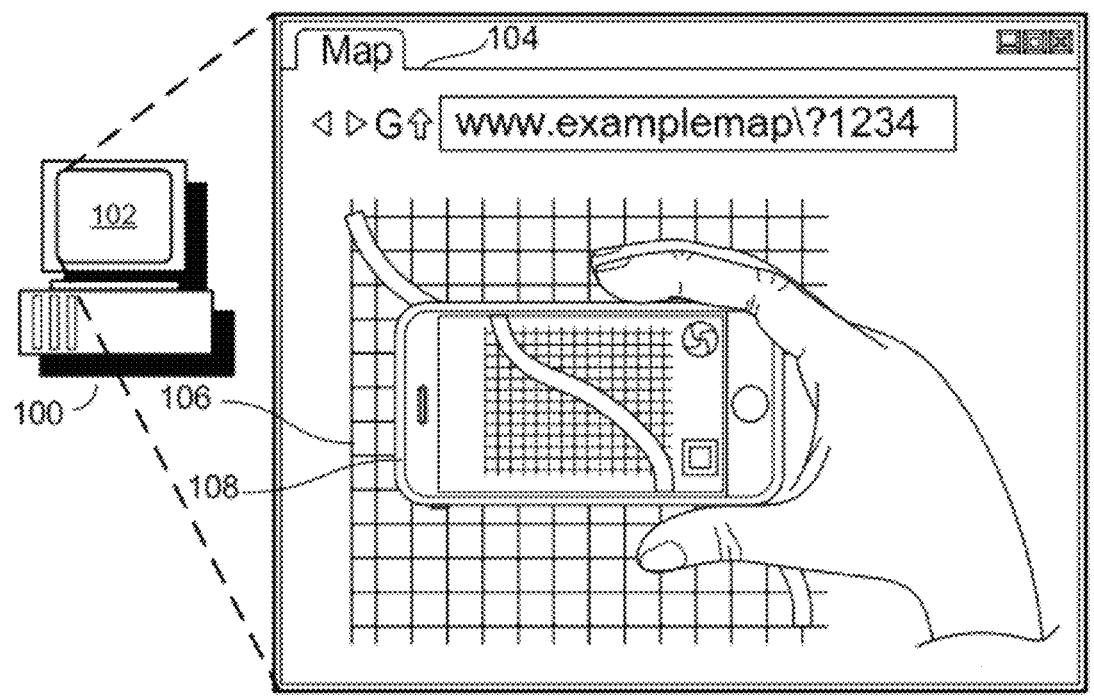
FIGS. 1A and 1B show a mobile device capturing state information from a monitor of a desktop computer.
Figure 1B:
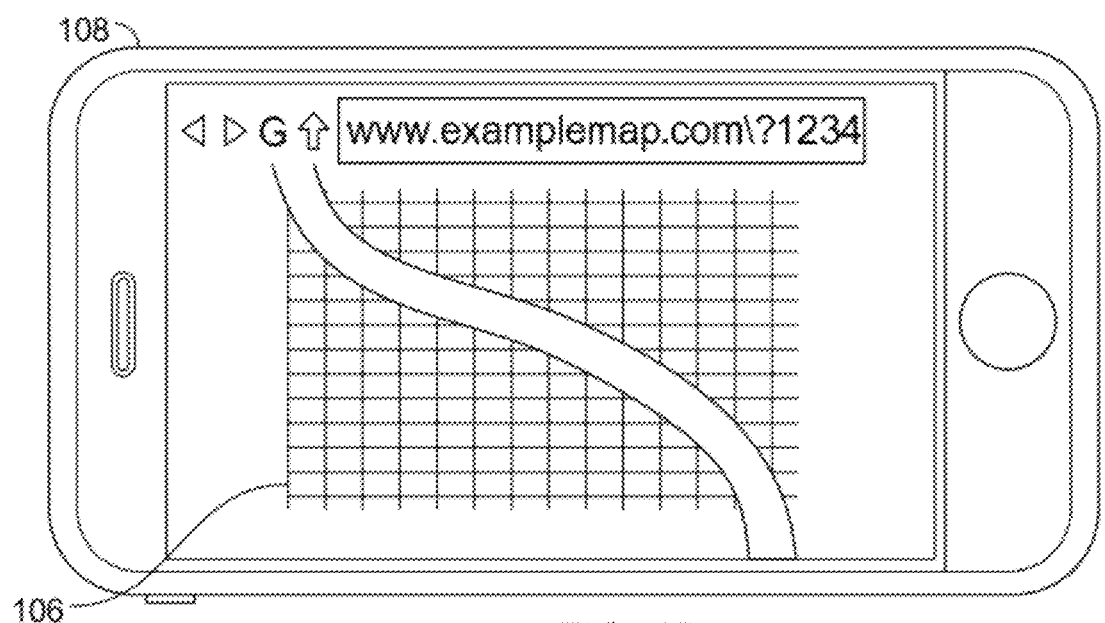

The following description discusses an example use case of the techniques here, and then discusses particular technical mechanisms for carrying out the use case and other such use cases. FIGS. 1A and 1B show a smartphone 108 capturing state information from a monitor of a desktop computer. In general, the figures show a use case of passing the state of a mapping application from a desktop computer to a smartphone, as mentioned above.

In FIG. 1A, a user is holding her smartphone 108 in her right hand and aiming it at a computer monitor 102 (or display device) of her computer 100 (e.g., a desktop computer). The user may have employed a web browser (shown by a browser tab 104) on her computer 100 to navigate to a geographic area on a map, such as the location of a business meeting. She may have chosen to use the computer 100 because of its relatively large monitor and flexible input mechanisms (e.g., a mouse, touch input, and the like). However, she may not be able to bring her computer 100 with her in her car, and she may need to consult the map as she drives. As a result, she has a desire to get the map information from her computer 100 to her smartphone 108. (A smartphone includes a computer, but the smartphone 108 is referenced separately from the particular computer 100 here to distinguish, in this example, the one computer of the user (the desktop computer) from the other (the smartphone).)

In this example, the screen of the smartphone 108 is showing a user interface for a standard camera application that may be included with the smartphone 108 when it is first provided to the user. In this example, the user has just captured an image of part of the map displayed on the computer monitor 102. The display of the smartphone 108 thus shows a subset of the map 106 that is displayed on the computer monitor 102.

FIG. 1B shows the smartphone 108 at a later time, when the smartphone 108 is showing the map itself in a mapping application of a web browser on the smartphone 108. In some implementations, the smartphone 108 shows the map in an independent mapping application installed on the smartphone 108. In the example shown in FIG. 1B, a URI 110 on the smartphone 108 matches a URI 112 displayed on the computer monitor 102. Such a match may be generated by analyzing the image on the smartphone 108 or a server system with which the smartphone 108 is in communication, recognizing that a browser address box is in the image, and performing optical character recognition on the characters in the box. As an alternative to the smartphone 108 performing the work alone (or with help from a server system), the computer 100 may also be consigned to assist in the process of getting the state of computer 100 to the smartphone 108. In such a system, as discussed in more detail below, the computer 100 and smartphone 108 may be authenticated or logged into a common on-line server system that includes text messaging features. The smartphone 108 may then package the captured digital image from the computer 100 into a text message and may send the image to the computer 100. The computer 100 may then use the image to determine what the user captured from the computer monitor 102, and thus the application and state that the user would like to replicate. The computer 100 may compare the received image to an image currently being displayed on the computer monitor 102, look for a match, and then identify the application that is represented by the match. The computer 100 may then determine the current state of the application, such as by obtaining a current URI from a web browser application.

Figure 2A:
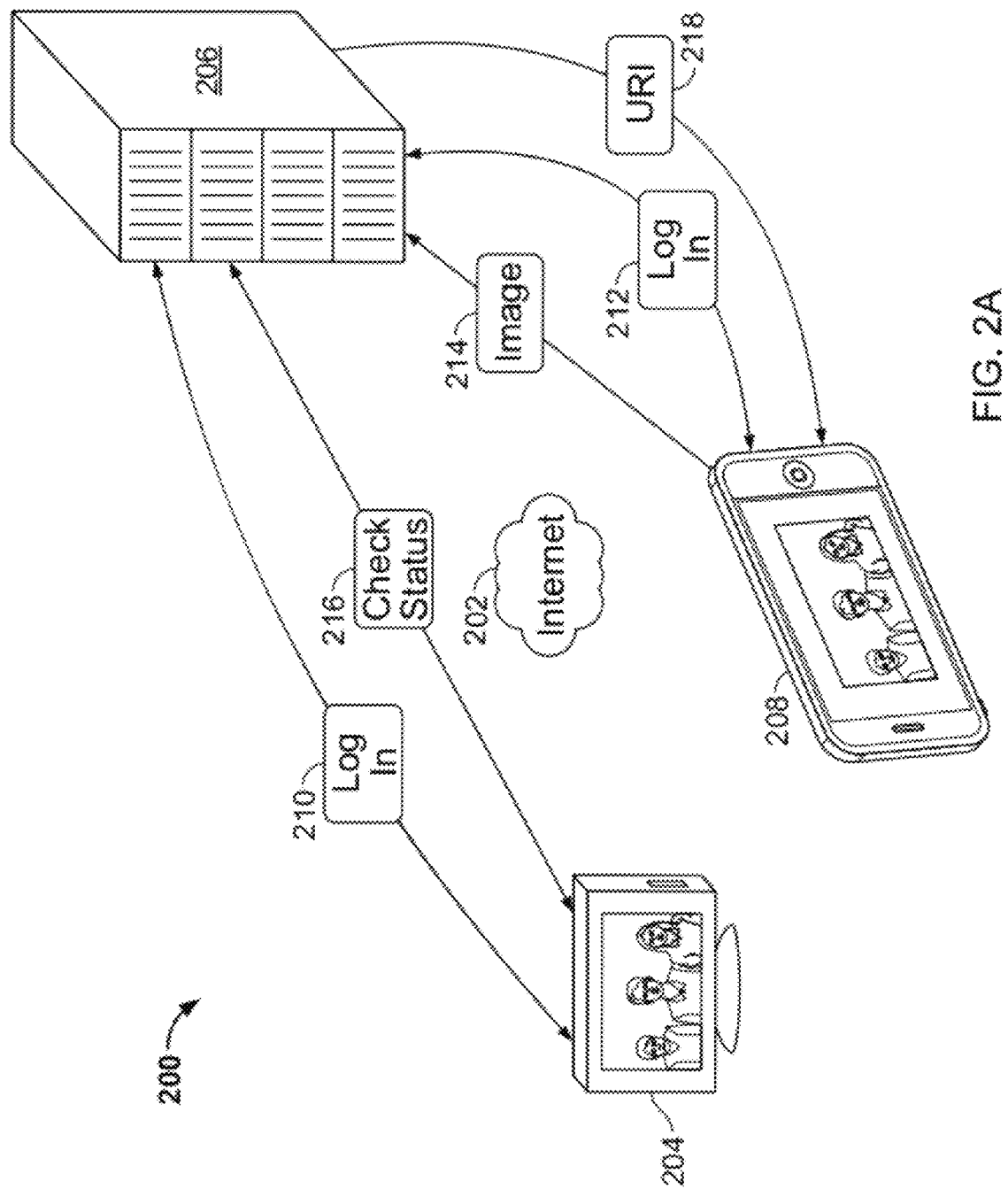
FIG. 2A is a schematic flow diagram of a system and process for sharing information between computers.

FIG. 2A is a schematic flow diagram of a system 200 and process for sharing information between computers. The system 200 may be used to implement the message flow just discussed for the use case from FIGS. 1A and 1B. In this example, the various components of the system 200 communicate through one or more networks that include the internet 202, using familiar techniques such as the TCP/IP protocol. Three main components of the system 200 include a desktop computer 204, a computer 208 (which may be a mobile computer), and a server system 206. The three components may cooperate with one another to provide acquisition and sharing of appropriate information between each component to permit the matching of states between the computers 204, 208. Additional or other components may also be employed, though the particular example components shown in FIG. 2A are provided to assist in the explanation of the relevant techniques in a clear manner.

The server system 206 may implement a standard instant messaging (IM) system that includes a cross-device information exchange system like PIE. The use of an IM architecture for the information sharing may be beneficial in certain implementations by (1) allowing the computers 204, 208 to communicate with each other without knowing the other's IP address; (2) providing persistent connections for sending and receiving messages in real-time, so as to avoid certain problems with Network Address Translations (NATs) and firewalls; (3) providing immediate messaging so that the computer 204 can receive a message immediately after the computer 208 captures an image of the display of computer 204; and (4) as the standard instant messaging systems can be fairly mature, well-developed, and well-documented systems, existing libraries and other elements may be used, the system can be modified and improved by many programmers, and the system can be implemented using existing hardware and software, by administrators who already understand such systems.

The particular messaging in one implementation is the Extensible Messaging and Presence Protocol (XMPP) system, which has been implemented commercially as the Jabber product. Such a product permits a single user to log on simultaneously from multiple "resources," or devices. The user account and resource is identified in communications by the following addressing scheme: "user@server/resource". Thus, a user can establish each of her devices initially with a single user name, and can avoid having to add all of her devices into a contact list manually. In addition, XMPP messages can be relatively large (compared, e.g., to SMS text messages), so that richer content, such as JPEG or other formatted digital images, may be sent using the protocol.

The computers 204, 208 each have programs installed and configured by the user to perform the state matching discussed above (e.g., via deep shooting or deep posting). The particular components in an example implementation are discussed in detail with respect to FIG. 2B. In general, the applications may be the same on both computers 204, 208, though certain components may be used only on the computer that has image capture capabilities. The applications may be programmed to capture an image, to post the image to a corresponding computer, and to launch an application that corresponds to an application on the other computer in response to a return communication from the other computer.

On the opposite side of an interaction, a target computer may include components for dispatching a received request from the initial computer that captured the image so as to determine whether the image matches the current display of the target computer. The determination is then used for identifying relevant state information of the target computer if there is a match, and for communicating the state information of the target computer back to the initial computer.

A particular information sharing process is shown by the flow arrows in FIG. 2A. The process begins when a user logs in to server system 206 with computer 204 (arrow 210) and thus establishes its presence in the system 200 and opens a persistent communication channel. At a same, earlier, or later time, the user may log in with computer 208 (arrow 212). The authentication process may cause a level of trust to be formed between the computers 204, 208, in that the computers may respond automatically in response to requests from other similarly-authenticated devices because the devices are known to be authenticated to the same user. Although only two computers 204, 208 are shown here for clarity, a user could log in with three or more different devices at the same time (e.g., a plurality of desktop computers, a tablet, a gaming console, and a smartphone). The relevant communications shown here may then be spread by the server system 206 to each of the similarly-authenticated devices.

Such communications may also occur between devices that are assigned to different users. For example, users may arrange themselves into groups with other users who they trust (e.g., others in their department at work) and the system 200 may be programmed to automatically pass messages of the type discussed here among the users. In some implementations, the trust may be limited so that a receiving user's device may generate a signal that a relevant communication has been received, and may ask the receiving user to confirm that she is willing to share information about the state of her computer (where the message can provide the identity of the requesting user and identify the information that is to be passed back to the requesting user). Thus, for example, two users who are colleagues and in a room together may have a first user capture an image of the second user's computer display, which will cause the second user's computer to request confirmation from the first user in order to share state information. In some implementations, the trust can be established at run-time, such as by having the target computer post a message for its user when a request for information from another device arrives, where the message can include an identity of the requesting user and also identify the information that will be sent to the requesting user, so that the target user can permit or deny access to the information. In such a situation, for example, the requesting user may have had to identify a test messaging address for the target user manually.

After the computers 204, 208 have logged into the system 200, the computers 204, 208 may wait for the system 200 to cause a sharing of information. However, using the text message protocols discussed here, the computers 204, 208 may stay alert for communications from other such computers. A particular information sharing session begins in the example shown in FIG. 2A when computer 208 is used to capture an image of the display on computer 204. In this example, a photo of three people can be displayed in a photo management application, including a hosted application, on the monitor of computer 204. The computer 208 is shown as having captured at least a portion of that image, passing the image along with other relevant information for the information sharing process to the text message server system 206 (arrow 214). Such a transmission can cause server system 206 to provide a message to all other devices that are pre-authenticated with the computer 208. As noted above, such devices may include all devices currently logged into the same user account, devices in a defined group, or other organizations of devices. In this example, the one other device shown that is pre-authenticated with the computer 208 is the computer 204, though the same user may have other devices that are pre-authenticated with the computer 208 that are not shown here.

The computer 208 can perform the image capture using an application that is specifically directed to the information sharing processes described here. The image capture can be performed via an extension to a native cameraphone system, or can be incorporated into the basic cameraphone functionality. In some examples, the functionality may be one option in a menu of options for sharing a captured image (where the other options can include emailing the image, posting the image to a social networking site, and the like). In some implementations, a device may automatically check whenever an image is captured to determine if the image shows a computer display, and if it does, the functionality discussed here may be instigated automatically.

Returning to the information flow of FIG. 2A, the computer 204 receives the message from computer 208 and begins a process of checking its own status against the information in the message (arrow 216). In particular, a computer 204 may take a screenshot of its own screen and compare that screenshot to the image received from computer 208. In one example, the image is encoded in a BASE64 format, and may be decoded using computer vision algorithms such as speeded-up robust features (SURF) or scale-invariant feature transform (SIFT). SURF is a visual features-based algorithm that is robust against scaling and rotation. SURF may be used in a process to detect the key points on a screenshot that is taken on computer 204 and on the image received from computer 208, respectively. In addition, SURF may be used in a process to locate the region that the first user captured with the camera of computer 208, by pairing each key point in a screenshot with each key point of the picture. Once the computer 204 has identified a matched region on the screen, it may obtain the X,Y coordinates of the corners of the region and the central point of the region and provide that information to the front-most application running on the computer 204 in that region.

The application may then respond with a message that provides information about its current state. In some implementations, the applications on computer 204 may be programmed by their developers to perform such actions using an application programming interface (API). In other examples, the application may be a browser that may have been provided with an extension for performing such actions. The information provided by the application may, in some implementations, include a URI that describes the current state of the application. Once the information is gathered, as shown by the information flow (arrow 216), the computer 204 may pass back to the requesting computer 208, through the server system 206, information that describes its current state, such as a URI.

Although not shown in this figure, other devices registered with the system 206 to the same user may have also received the message and acted in a similar manner. In particular, those devices may have received the image, compared it to a screenshot of their current displays, determined that they were not the target of the communication and stayed quiet, or returned respective messages to the computer 208 that indicated they did not have a match and would not be providing current state information for themselves.

The URI or other form of information that describes the state of the application on the computer 204 is passed back by way of a corresponding text message to the computer 208 (arrow 218). The computer 208 may then interpret the received information to launch appropriate applications or make an appropriate application the focus of the computer 208, and may transition the application into a state that matches the state of the corresponding application on the computer 204. For example, the computer 208 may pass a received URI as an address to a browser running on the computer 208.

In a similar example that involves deep posting from the computer 208 to the computer 204 (as compared to deep shooting to obtain information from the computer 204 to the computer 208), a user of the computer 208 may affirmatively push the state of the computer 208 out to the computer 204. As one example, a user may have started editing a document on computer 208 (e.g., her smartphone) while walking to her office, and may want to complete the editing of the document on her computer 204 (e.g., a desktop computer). In this example, the user may invoke an information sharing application, which may cause the camera on the computer 208 to be activated, and also overlay the current view of the camera with the user's current display on the computer 208. The user may then aim the camera at the computer 204 and capture an image of the computer 204. The computer 208 may then submit a text message in a manner that is similar to that discussed above but with an indication that the computer 204 is attempting to share its own state with another computer, and with information that describes that current state. The computer 204 may then receive the message and may perform image matching as described above for deep shooting. For deep posting, however, the computer 204 determines whether it is the computer to which the user intends the post to be directed. If the computer 204 determines from the matching that it is the target computer, it may launch or make active an appropriate application or applications, and may set the state of those applications according to the information it received in the text message from computer 208. In the example above, the computer 204 may launch a hosted word processing system and may open the same document that the user was editing on the computer 208, so that the user may continue the editing process easily and seamlessly.

Thus in this manner, the techniques described here may provide, in some implementations, convenient and intuitive mechanism for sharing or synchronizing information between computers that are in visual proximity to each other. Users of such computers are aware of the camera functionality on their computers and may thus invoke the information sharing processes described here. In addition, an information sharing may occur over standard TCP/IP and text messaging functionality. In general, this functionally can be available and activated at all times on most computers. The process may be implemented in most existing systems with little disruption and can be used intuitively by users of those systems.

Figure 2B:
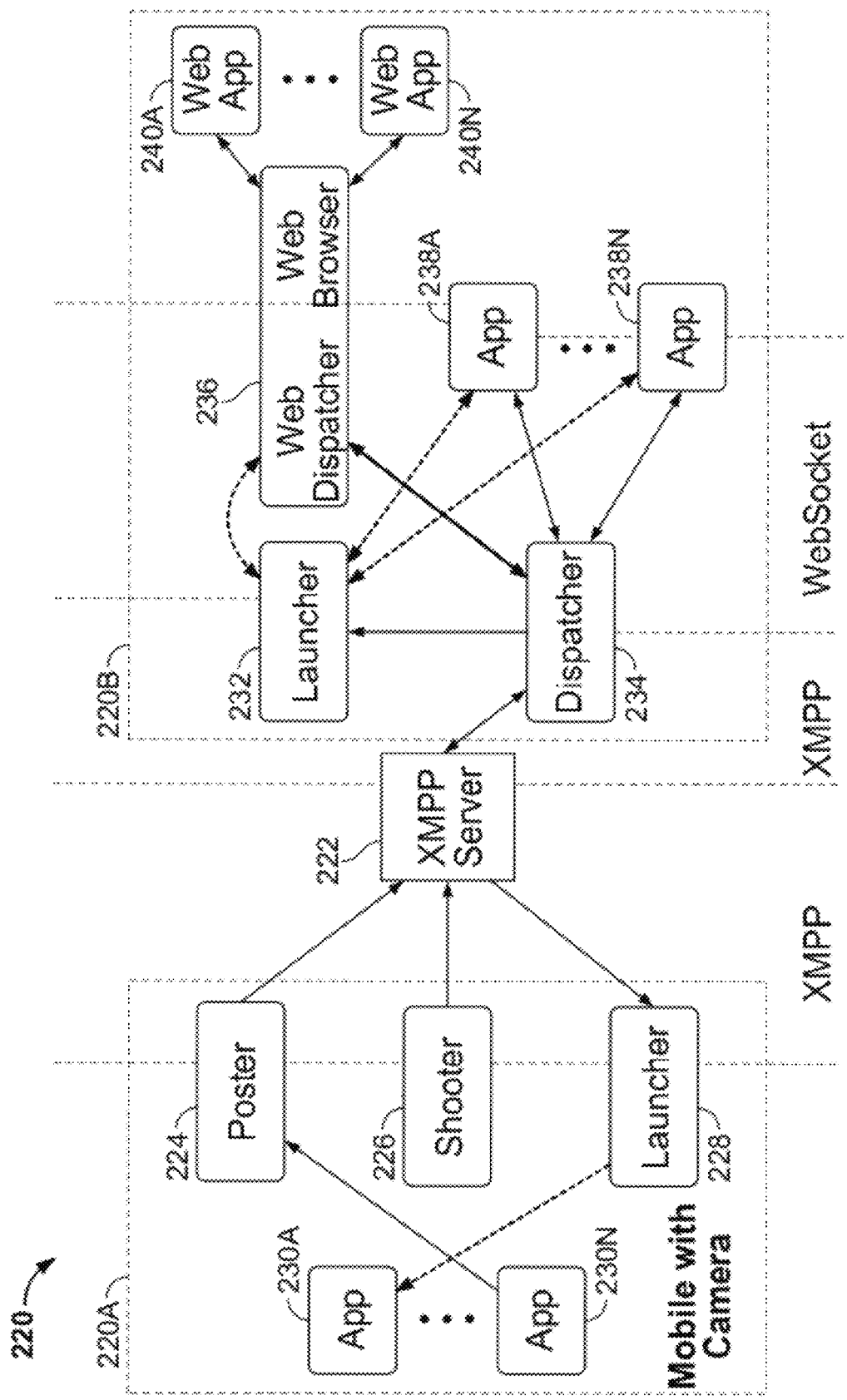
FIG. 2B is a schematic diagram of a system for passing messages that share state information about computers.

FIG. 2B is a schematic diagram of a system 220 for passing messages that share state information about computers. In general, the system includes client computing devices communicating through an XMPP server 222. In the example of FIG. 2B, particular components of a mobile device 220A that includes a camera and a desktop computer 220B are shown. Generally, all devices may include all of the components of the system 220, but may only implement certain of the components in a certain session, depending on whether they are the device that is capturing an image or the device that is responding to receipt of a captured image. In the example of FIG. 2B, the mobile device 220A includes a camera and will thus be capturing an image off the display of the desktop computer 220B, and the desktop computer 220B will be responding. However, in other implementations, the desktop computer 220B can be provided with a web cam, and may be the image capture device.

In the example of FIG. 2B, the mobile device 220A and the desktop computer 220B include multiple component types, for example, a shooter, a poster, a dispatcher, launchers, and applications. The shooter component and the poster component can operate on a device that captures images (e.g., a mobile device). The dispatcher component can operate on target devices or computers that share information in deep shots or accept posts from deep posting. The launchers can operate on a device that captures images as well as a target device. When operating on the mobile device 220A, a launcher 228 launches mobile applications to present the information that is captured by deep shooting. When operating on the desktop computer 220B, a launcher 232 causes desktop applications to present the information that was posted by deep posting.

The particular messages exchanged between and among the components may be structured and encoded in the JavaScript Object Notation (JSON) format. In other words, on top of XMPP, the body of the messages between the XMPP server and the components connected to it are encoded in JSON. The messages on top of WebSocket between the dispatcher and the applications may also be in JSON. WebSocket is a protocol that supports full-duplex and bi-directional communication over a TCP socket. WebSocket is currently being standardized by the Internet Engineering Task Force (IETF) and the World Wide Web Consortium (W3C). In general, many web browsers support the protocol, and many desktop applications can support the protocol because of the use of TCP sockets, where WebSocket can be an extension of TCP sockets with a HTTP-like handshake protocol.

In operation, every time each of applications 238A-238N and 236, where the applications 238A-238N and 236 support deep shooting, is launched, the launched application registers itself to a dispatcher 234 though a WebSocket connection on a TCP port 54080. A registration process starts after the standard WebSocket handshaking. The launched application sends out a line "reg APP_NAME" that ends with a carriage return, line feed (CRLF) terminator, where APP_NAME is the name of the launched application. If the dispatcher 234 accepts the registration of the launched application, the dispatcher 234 returns "ok" with a CRLF. If the dispatcher 234 does not accept the registration, the dispatcher 234 returns a message indicating the reason and closes the connection. To support deep posting, an application can optionally send an "accept URI_SCHEME" command, which indicates what types of URI schemes the application accepts. For example, an email client can register "mailto:", and a web browser can register "http:" and "https:". Once the registration is completed, this WebSocket connection can be kept persistent until the application is closed, so that, for example, the dispatcher can proactively notify an application when a request is coming. Particular processes using the components of system 220 are discussed in FIGS. 3A and 3B.

Figure 3A:
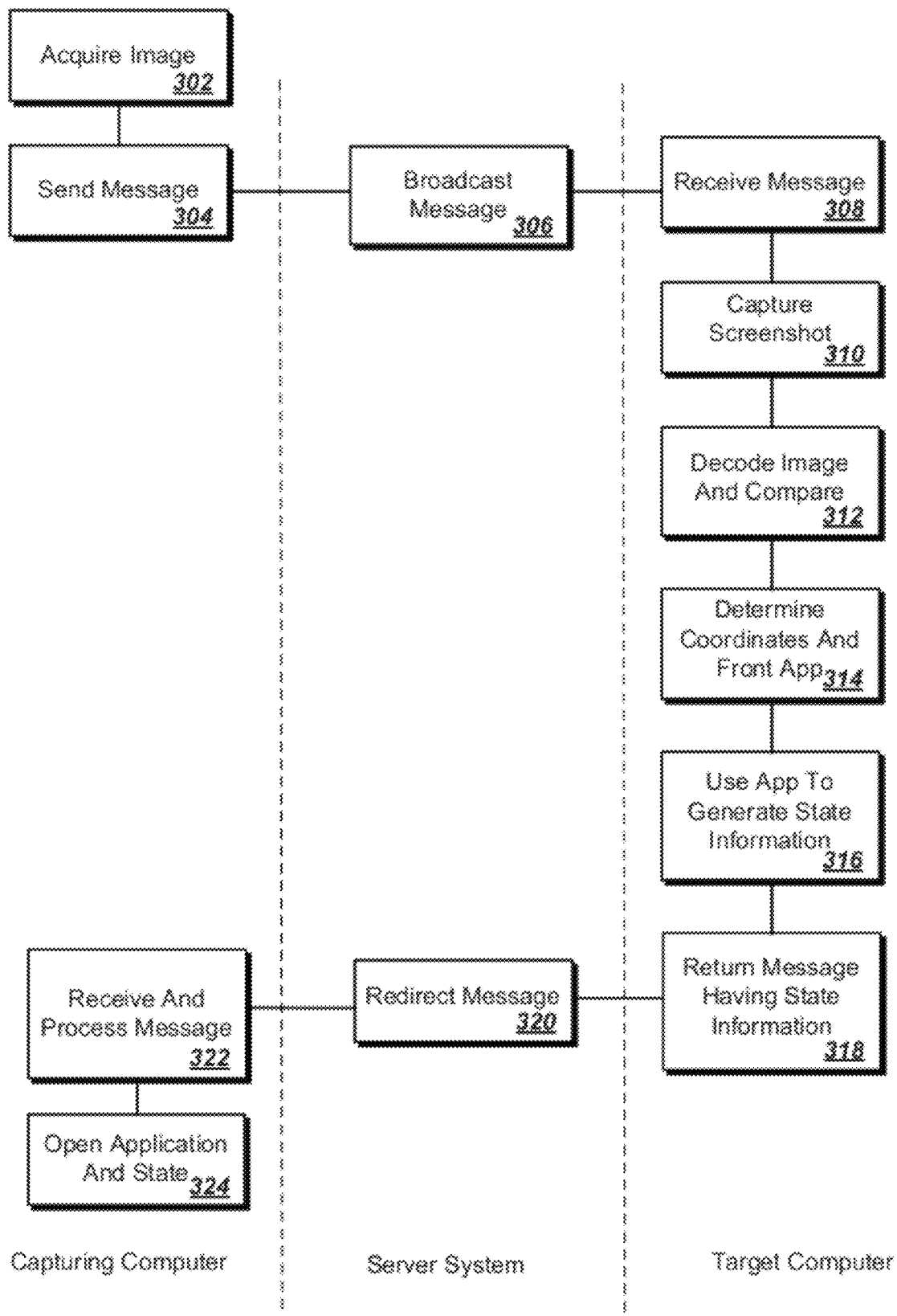
FIGS. 3A and 3B are swim lane diagrams of processes for sharing state information between computers.

FIG. 3A shows an example for deep shooting (i.e., capturing the state of a computer that is the target of a digital image).

Figure 3B:
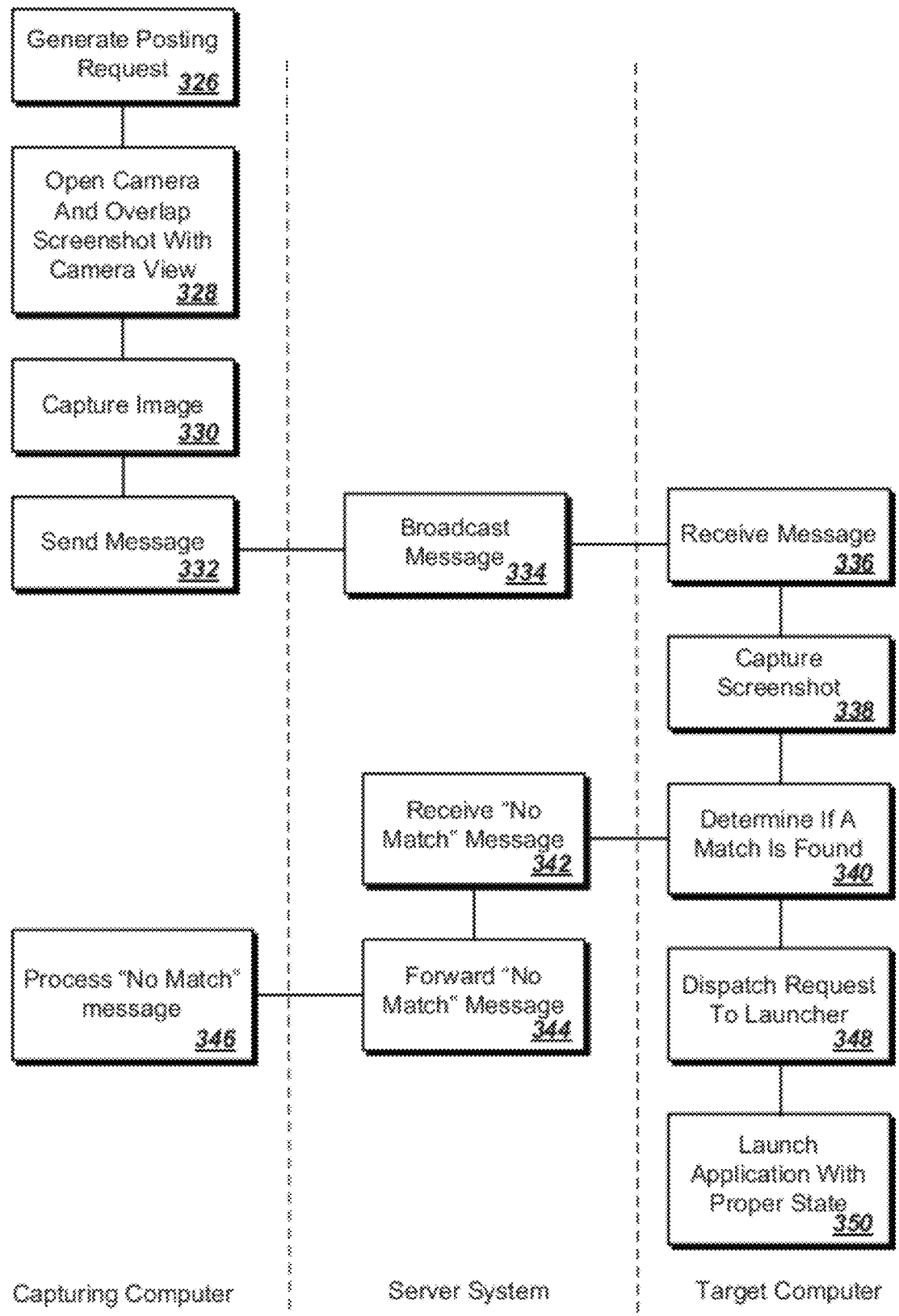

FIG. 3B shows an example for deep posting (i.e., providing the state of a computer that captures an image to a computer whose display is in the image).

The processes for both FIGS. 3A and 3B are described, with further reference to the system 220 in FIG. 2B Referring to FIG. 2B and FIG. 3A, a user initially captures a picture (image) using a shooter 226, where the picture is directed to show a display of the desktop computer 220B (box 302). Once a user uses the shooter 226 to take a picture of a region of interest on a computer monitor included with the desktop computer 220B, an XMPP message with a subject "deepshot.req" is sent by the capturing computer (e.g., the mobile device 220A) (box 304). The sending of this message indicates a deep shooting request is then broadcasted to each device that is currently logged in for the user (box 306). The message in one example can include one pair of key-values (e.g., content, and the picture encoded as a BASE64 string taken by the user).

The dispatcher 234 running on the desktop computer 220B receives the "deepshot.req" message (box 308). The desktop computer 220B takes a screenshot of the display of the desktop computer 220B (box 310). The dispatcher 234 then decodes the received BASE64 message, and compares the decoded picture against the screenshot using SURF or a similar algorithm (box 312). When the dispatcher 234 has found a matched region in the screenshot, it determines the x-y coordinates of the corners of the matched region and the central point of the matched region, and also determines which application on the desktop computer 220B is the front most application (box 314).

The dispatcher 234 in this example is designed as a daemon that can continuously run as a background application on a computing device. The dispatcher 234 has the user's credential, so the dispatcher 234 can connect to the XMPP server all the time. Therefore, the availability of a computing device can be obtained from the XMPP server from any other computing device. When the dispatcher 234 has made the determinations described above, the dispatcher 234 uses the already-open WebSocket connection with each running and participating application (applications 238A to 238N and 236) to provide a JSON request to the relevant applications 238A-238N and 236 that include two pairs of key-values which can be coordinates (e.g., corners and a list of four pairs of x-y coordinates, and center and one pair of x-y coordinates), where the coordinates are relative to the upper-left corner of the dispatched window.

The application then determines its state in any relevant manner and returns its state information to the dispatcher (box 316). Such information may be, for example, a URI in a current web browser address box. Other similar information may be provided by other applications. In some examples, the response from the application can include at least one pair of key-values (e.g., a URI, which represents the state of the application). Applications can create their own URIs making the URIs compatible with public standards (e.g., http:,tel:, geo:, etc.). In some cases, an application can attach offline resources or files. Each attached resource or file can be stored in a JSON structure with two pairs of key-values (e.g., (1) a name, which is the file name, and (2) a content, which is the BASE64-encoded content of the file). The attachments can be stored in a JSON array identified by the key "files" in the reply message.

A web browser on the desktop computer 220B may present a special type of application. The web browser may be provided with a web dispatcher extension 236 or plug in, so that the browser may participate in the processes described. All of the applications may run in the browser, without the authors of those applications having to explicitly support each process. The web dispatcher extension 236 acts as a second level dispatcher, routing messages from the dispatcher 234 to the appropriate web page in a web browser and sending reply messages back to the dispatcher 234. The web dispatcher extension 236 provides a JavaScript callback function (e.g., DeepShot.addListener(listener)) to all web pages, so that web developers may hook their internal data to the shooting and posting processes described here.

The web dispatcher extension 236 also can be a default responder for web applications that may not explicitly support the processes described here. If the web dispatcher extension 236 receives a request to obtain data from a site that does not register itself using the callback function, it can return a URL for the site as a default response. The URL on the address bar can map to the state of the current web application. However, some AJAX applications may not have this property, or they may decide to hide their real URL. To address this issue, the web dispatcher extension 236 can proactively extract information from web pages by injecting content scripts. As a browser extension, the web dispatcher extension 236 can be capable of injecting a variety of content into a web page. Therefore, the web dispatcher extension 236 can inject a piece of JavaScript that calls the callback function DeepShot.addListener into a web page to extract the web page's internal information. For example, a mapping application may not show the URL to the current region of the map on the address bar. To get the real URL that represents the current state (the current region of the map), the web dispatcher extension 236 can inject a content script that calls "document.getElementById('link').href" to obtain the real URL stored in the document object module (DOM) element with the id "link". Using this content script provides a user the ability to use deep shooting to open a map displaying on her computer in one step.

Upon receiving a response from one of the applications 238A-238N and 236, the dispatcher 234 may create a new XMPP message with a subject "deepshot.resp", which represents a response message. The body part of the response message is the reply from the application, which is a JSON encoded string. The dispatcher may also insert two new pairs of key values into a message (e.g., (1) a title, which indicates the name of the application, which may be stored and used to search or browse the history of deep shooting, and (2) a thumbnail, which is the BASE64-encoded thumbnail of the matched region of the screenshot, which can also be stored in a log and used to browse a history of deep shooting by a user). The dispatcher 234 then returns the constructed message that includes state information (box 318) to the mobile device 220A via the XMPP server 222 (box 320). The mobile device 220A (the capturing computer) receives and processes the message (box 322).

When the relevant information has been extracted from the message, the information may then be provided to the launcher 228. The launcher 228 may be monitoring for the receipt of a message with such a name since it sent out the initial message to the desktop computer 220B. When a message with that subject arrives, the launcher 228 decodes the body of the message encoded in JSON and writes all attachments to the storage on the mobile device 220A. The launcher 220A opens an appropriate application that handles the type of URI included in the reply from the desktop computer 220B and passes the response to the application in order to restore the task on the desktop computer 220B (box 324). Once an application is successfully launched, the process of deep shooting is completed.

FIG. 3B shows an example of a deep posting process that is formatted similarly to the deep shooting process just described. The deep posting process can be based on the same foundation described above for deep shooting process, including JSON structures and XMPP communication. The key role for the deep posting process lies with a poster 224. The poster 224 can operate on the mobile device 220A that includes a camera. The poster 224 can accept requests from applications that support deep shooting on the mobile device 220A. These applications can encode data to migrate as a JSON format structure that has at least one pair of key-values (e.g., a URI, which represents the internal state of the application).

The process in FIG. 3B starts when an application that is programmed to seek deep posting provides a posting request to the system of a device having a camera (box 326). Once the poster 224 receives a posting request from an application, the poster 224 opens a camera application and overlaps the screenshot of the application on the viewfinder of the camera so that a user can see the targeting device and the information to post at the same time (box 328). After the user has aligned the view of the image she would like to capture within the viewfinder of the camera, the user can indicate capturing of the image (e.g., press a button). As a result of the user input, a JPEG image is captured and the image is encoded into a BASE64 string. The captured, encoded image is then inserted into the JSON structure from the posting request with the key content (box 330). The poster 224 can create an XMPP message with a subject "deeppost.req", with the entire JSON string as its body. The poster 224 can then send this XMPP message to all relevant devices (e.g., all devices currently logged into a user's account) in a manner similar to that for deep shooting (box 332).

The XMPP server 222 then broadcasts the message to all such devices (box 334), which receive the message (box 336) by way of each of their respective dispatchers. For example, the XMPP server 222 broadcasts the message to the desktop computer 220B, which receives the message by way of the dispatcher 234. Each respective device can then run the computer vision process discussed above for deep shooting to match the picture taken by the user (the captured image) against the particular device's screenshot (boxes 338, 340). For example, the desktop computer 220B runs a computer vision process in order to determine if the picture taken by the user matches a screenshot of the display of the desktop computer 220B. If no match is found, the dispatcher 234 replies to the server system with a "no match" message (box 342, 342), the server system forwards the message back to the capturing computer (e.g., the mobile device 220A) (box 344). The capturing computer (e.g., the mobile device 220A) processes the "no match" messages (box 346). If the dispatcher 234 determines that there is a match, the dispatcher 234 sends the request to the launcher 232 (box 348).

As discussed above, each of the applications 238A-238N and 236 can register the types of URI schemes it supports. The launcher 232 can use this information to launch an appropriate one on of the applications 238A-238N and 236 for the URI or other state information received from the capturing computer (e.g., the mobile device 220A) (box 350). Each of the applications 238A-238N and 236 may register multiple URI schemes. In addition, multiple applications can handle a URI scheme. If multiple applications can accept a URI scheme, in some cases, the launcher 232 can open a dialog to ask the user to select an application. In other cases, if multiple applications can accept a URI scheme, the launcher 232 can launch a default application that can be selected prior to launching.

Figure 4:
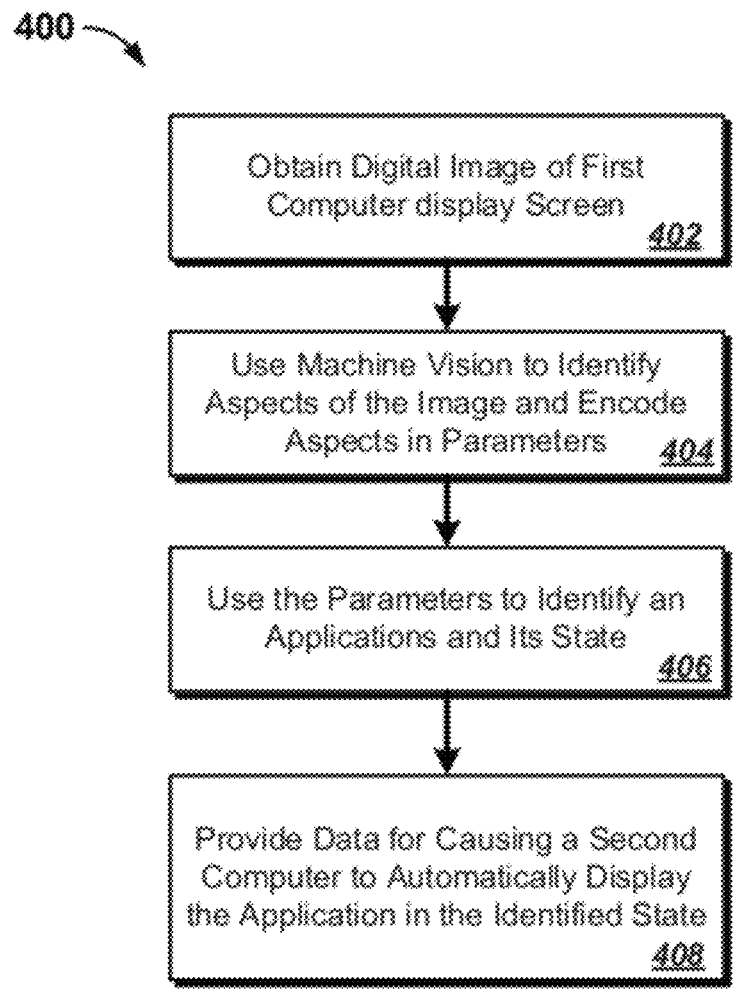
FIG. 4 is a flow chart of a process for moving information between computers.

FIG. 4 is a flow chart of a process 400 for moving information between computers. The process 400 can be considered a generalized version of the processes described above. The process 400 begins, where a digital image of a computer screen or display is acquired (step 402). The acquisition may be by mechanisms described above, where a first user device is aimed at a display of a second user device, where both devices are logged into an account of the same user.

Machine vision techniques are used to identify aspects of the image that may be relevant and to encode parameters that represent those aspects of the image (step 404). In examples similar to those discussed above, the aspects may include portions of the image that match an image taken of a screenshot for the computer that was the target of the first image. The parameters may include coordinates on the display of the second or target device corresponding to a topmost application, and a descriptor for communicating with the application.

The parameters are used to identify the application and the state of the application (step 406). For example, the application name may be used to contact the application, which may identify its own state such as by returning a value of a URI that is currently associated with the application.

In another example, machine vision may be used to identify words on the display, and to thereby infer what application is in the image and the state of that application. As one example, machine vision may be performed on a title bar of an application or an address bar in a browser application. Also, other words on a display may be used to further indicate the state of the application. As one example, where text in an address bar indicates that the application is a web browser running a web-based mapping application, other text on the display may be used to determine the geographic area to which the mapping application was directed.

Data is provided for causing a second computing device (that is different that the computing device that was the target of initial data capture) to automatically display the relevant application in the determined state (step 408). In the main examples discussed above, such a step may be carried out by having the application on the target device provide its state information to another component that prepares a text message to be sent back to the initiating device, where the text message can further include information that identifies the application and the state. In the other example described, where optical character recognition is used, the text that is identified may be organized by the application running on the initiating device. The organization of the text may be such as to result in text that can be used to submit a search query to a remote search engine, or to construct a URL in another manner. For example, the identification of a mapping application from text in a title bar or an address box may be used to identify a domain for building a URL, and text on the map may be used to identify arguments to be submitted to the domain.

Figure 5A:
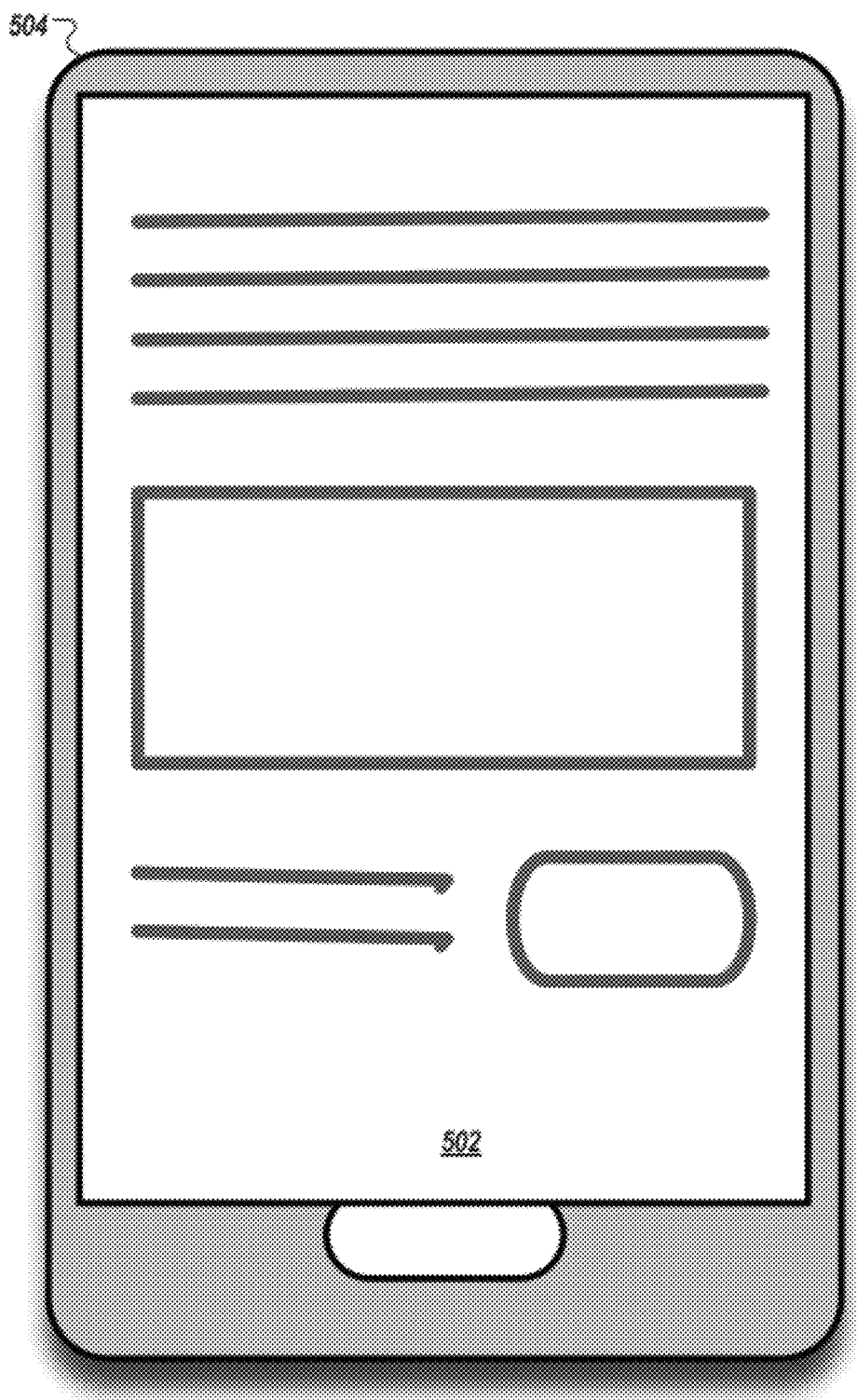
FIGS. 5A-5C show the posting of a user interface from a mobile device onto a display of a desktop computer.
Figure 5B:
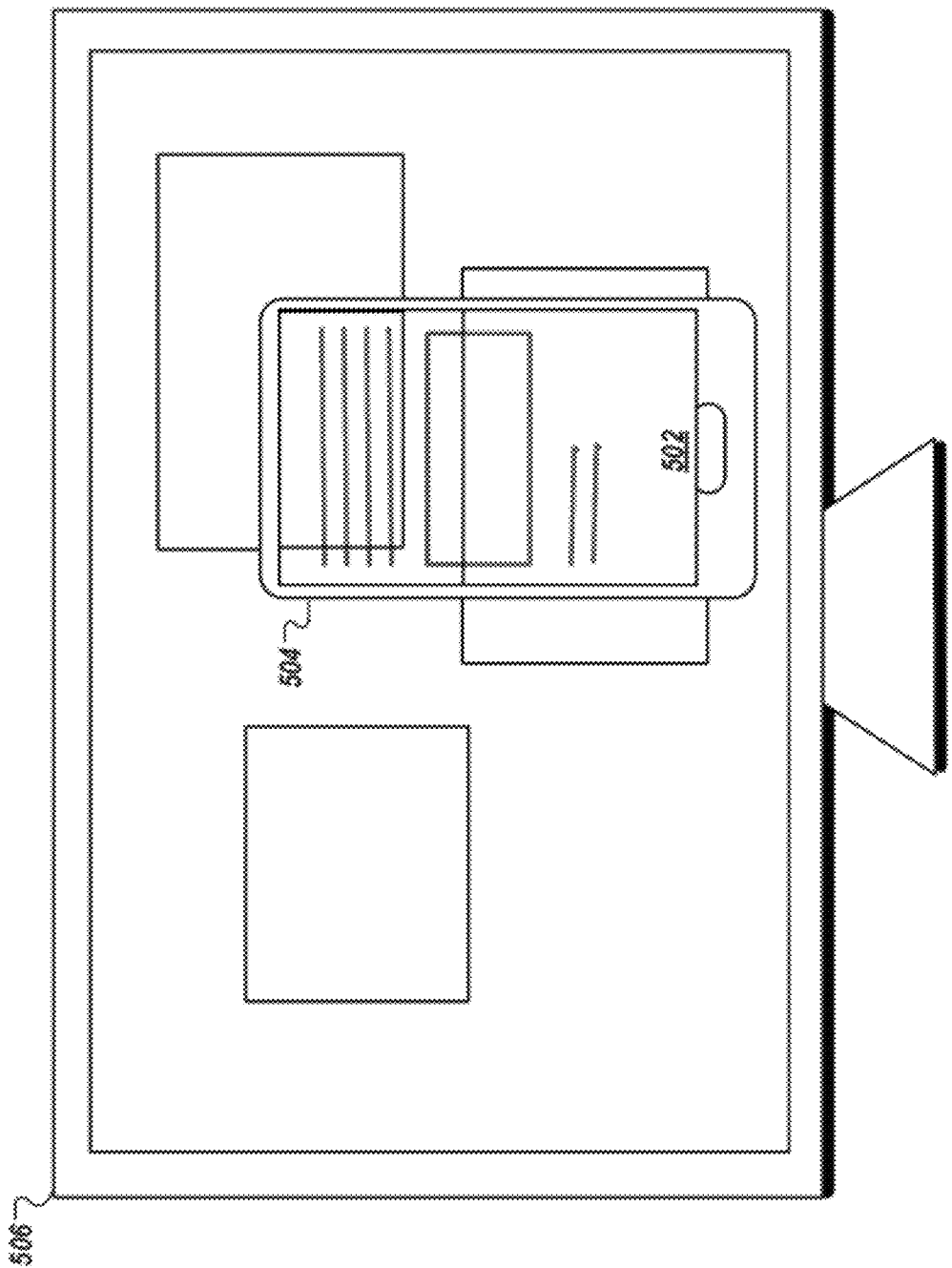
Figure 5C:
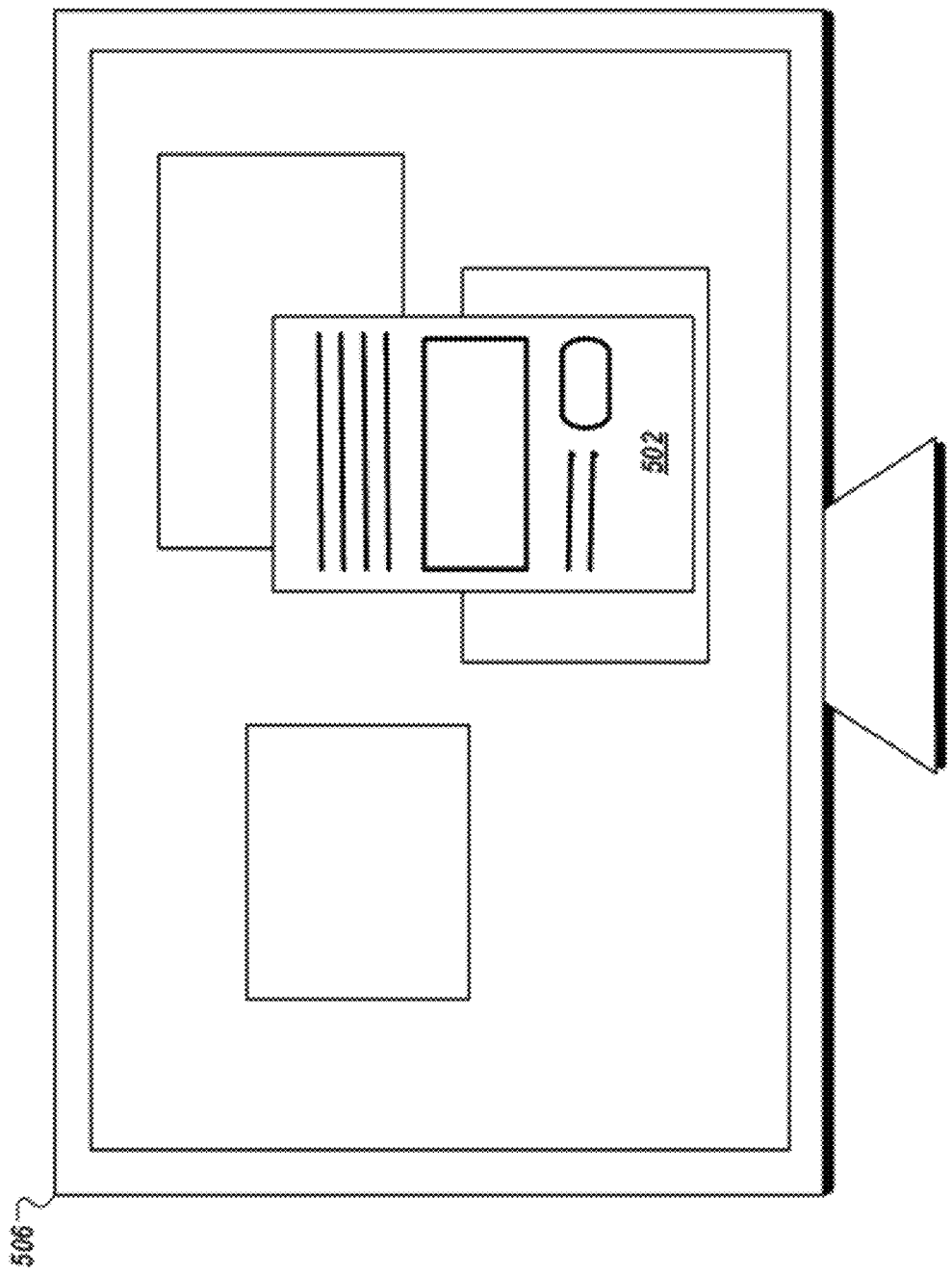

FIGS. 5A-5C show the posting of a user interface 502 from a mobile device 504 (e.g., a smartphone) onto a display 506 of a desktop computer.

In some examples, a deep shooting prototype was implemented to support both deep shooting and deep posting. The mobile device side was implemented using JAVA on a smartphone. On the other side (e.g., the computer side), the dispatcher and the launcher were implemented in Python on a laptop computer. An XMPP server was set up using Jabber on Linux. The default configuration of Jabber has a limit on the size of messages it can handle. To allow the potential large size of the content transferred in the system in the messages, the message size limitation was disabled. Apart from that change, the code of Jabber was not modified.

In other examples, in order to minimize the effort to support deep shooting for application developers, a Java library was developed that implements the dispatcher, an application communication process, and hides the WebSocket connection inside the library. The library has a DeepShot class that has one public method void add Listener(Listener listener, String app_name, String[ ] accepted_uris) for applications to register themselves to listen to deep shot requests.

In more examples, a default responder was implemented in a dispatcher (e.g, dispatcher 234 as shown with reference to FIG. 2B) to handle the case where the target application does not support deep shooting. In addition, an extension for a web browser was implemented to support URL migration for web applications and also to support proactive content extraction by injecting content scripts.

Referring to FIG. 2B, a default responder (e.g., implemented in the dispatcher 234) can provide useful information when replying to a target application (e.g., one of the applications 230A-230N on the mobile device 220A) if the targeting application has not registered with the dispatcher (e.g., dispatcher 234). In some cases, a default response from the default responder may not be opened directly by the applications 230A-230N as in the case of normal responses, however, the goal is to seamlessly migrate the information showing on a computing device (e.g., the display of the desktop computer 220B) to a mobile device (e.g., mobile device 220A). To achieve this goal, the screenshot of the entire display screen of the computing device (e.g., the display of the desktop computer 220B) is transferred to the mobile device 220A along with the coordinates of the matched region. Therefore, a user can see a clear version of the image of the display of the desktop computer 220B without noise and distortion that may be caused by the use of a separate physical camera to capture the image of the screen in a picture. The user can pan and zoom the screen to see more details or other areas not in the original picture. In addition, when the dispatcher 234 captures the screenshot, the dispatcher 234 can also detect clickable URLs and other interesting information (e.g. phone numbers or addresses) using, for example, an accessibility API of an operating system. This information in the form of metadata can be transferred along with the screenshot. The user can select (using an input device included on the computing device) a URL in the screenshot to launch a browser or can select a phone number in the screenshot in order to dial the number directly.

To support web applications, a web dispatcher extension or web dispatcher, was created as a web browser extension. The web dispatcher can have three main functionalities. First, the web dispatcher can act as a second level dispatcher, routing messages from a first level dispatcher to the appropriate web page in a browser and sending reply messages back to the second level dispatcher. The web dispatcher can also provide a JavaScript callback function "DeepShot.addListener(listener)" to all web pages, allowing web developers to simply hook their internal data on Deep Shot. Second, the web dispatcher can be a default responder for all web applications that do not support Deep Shot. If the web dispatcher gets a request to ask for data from a site that does not register itself via the callback function, the web dispatcher can simply return the URL to the site as a default response. The URL on the address bar can map to the state of the current web application. However, some AJAX applications do not have this property or hide their real URL. Fortunately, the last functionality of the web dispatcher can deal with this issue. Third, the web dispatcher can proactively extract information from web pages by injecting content scripts. As a browser extension, the web dispatcher can be capable of injecting any content into any web pages. Therefore, a piece of JavaScript that calls "DeepShot.addListener" can be injected into a web page to extract its internal information proactively even though the original web developers may not have planned to support Deep Shot. For example, a maps application may not show the URL to the current region of the map on the address bar. In order to obtain the actual URL that represents the current state, a content script that calls "document.getElementById('link').href" can be injected in order to obtain the actual URL stored in the DOM element with the id "link". With this script, a user can use deep shooting to open any map displayed on their computer.

The developed system was evaluated to explore whether using a camera to locate a region on a monitor is feasible or not in terms of speed and accuracy. The first experiment tested system speed and the second tested the accuracy of the image matching techniques.

Experiment 1

A MacBook Pro 15" computer with a high-resolution 1680×1050 monitor was used as the target device, and a Nexus One smartphone running Android 2.2 was used as the capturing device. The capturing device was held by a man at a distance between 20 cm to 40 cm from the display, and a pitch angle between ±20 degrees so that around ⅓ of the screen could be seen through the viewfinder.

Four types of targeting applications (GOOGLE STREET-VIEW photos, text from YELP.COM, long articles with little information from CNN.COM and Maps from GOOGLE MAPS) were examined and three pictures were taken using deep shooting for each application. The procedure involved: 1) taking a 512×384 picture; 2) sending this picture via a XMPP server to the targeting device; 3) once the picture arrived, the targeting device took a screen shot of the entire screen (1680×1050) and resized it to 840×5254) the targeting device extracted SURF features from the picture and the screenshot, and then matched the features using the process described above; 5) the system combined the information returned by the targeting application (i.e. a URL in this experiment) and a thumbnail of the matched region, and then sent the message via the XMPP server back to the capturing device; 6) once the capturing device received the reply, it saved the attached thumbnail and opened the URL using an appropriate application.

In the total twelve trials (three pictures for four applications), the average time of the whole procedure was 7.74 seconds (SD 0.30 seconds), which is an acceptable amount of time. Examining each step, the network transmission occupied about 50% of the total time, while the other processing time took 34% on the targeting device and 16% on the capturing device. The duration of the transmission time was dependent on the process of attaching one picture and one thumbnail in the messages and the subsequent routing of the messages to an external server. Therefore, the transmission time may be reduced by not transmitting pictures and not passing to a third party.

Experiment 2

A MacBook Pro 15" computer monitor was used with adjustable tilt and pitch angle for the screen. There were four settings of the pitch angle for the screen: 70°, 90°, 110°, and 130°. The laptop showed a GOOGLE CHROME full-screen browser with a web page of a popular local restaurant (from YELP.COM) consisting of texts and images. A Nexus One smartphone including a camera was tied to an L-square ruler that was perpendicular to the floor. The height of the camera, measured from the surface of the laptop to the center of the camera lens, was fixed to 19 cm while the pitch angle was 90° or 110°, and 14.5 cm while the pitch angle was 70° or 130°. These height settings allowed the camera to focus around the same target, the name of the restaurant, on the screen. Finally, the phone was set in front of the screen with a distance, which was measured from the screen shaft to the camera lens, from 5 cm to 50 cm. For each pitch angle, five pictures were taken for every 5 cm between 5 cm and 50 cm for a total of 200 pictures.

Figure 6:
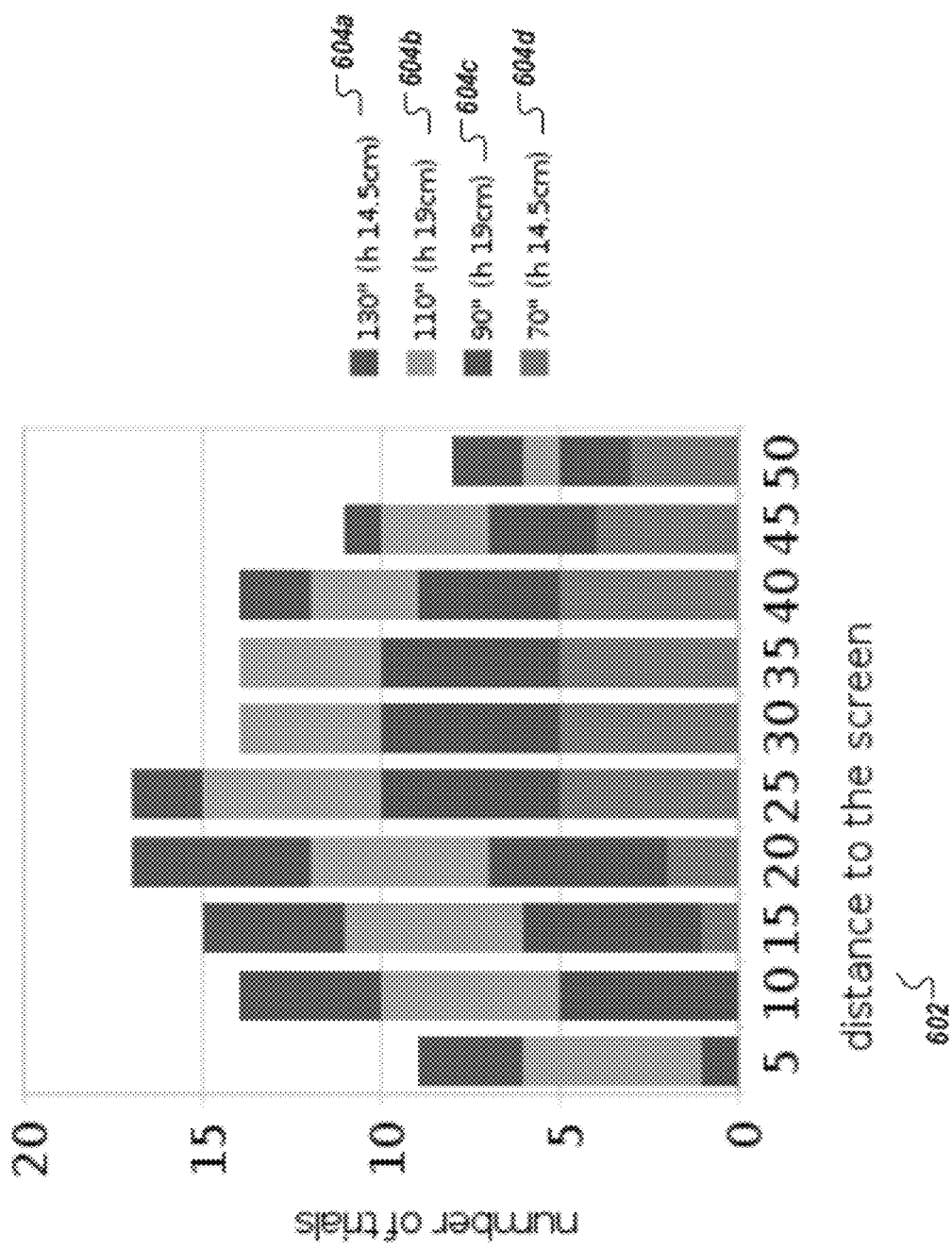
FIG. 6 illustrates a graph of a number of trial pictures taken with respect to pitch angle and distance between the camera and the screen.

The techniques described above were used to match each picture against the screen display on the laptop. If the center of the matched region overlapped the expected region on the screen, the match was considered successful. FIG. 6 illustrates a graph of a number of trial pictures taken with respect to pitch angle and distance between the camera and the screen. FIG. 6 shows the number of successful matches for each distance setting 602, while each bar indicates the total number of matches for the four pitch angles 604*a-d*.

The results show that the matching process is improved if the camera is parallel to the monitor and the distance between the camera and the monitor is in a range between 10 cm and 40 cm. This range can cover a small region that can include, for example, the name of a restaurant and its basic information. Even if the camera is tilted by 20 degrees toward or away from the monitor, the camera to monitor distance range may be about 30 cm.

Below are a number of information sharing scenarios or use cases.

Scenario 1: Taking Information to go (Desktops to Mobiles)

This type of scenario motivated the development of deep shooting. People usually work on desktop computers or laptops at work or home. Before moving to another place, they may look up the information related to that place on the computers. However, people forget things quickly. They usually need to write down the information on a piece of paper or look up the same information over again on the mobile phones when they are moving. In this kind of scenario, people can take the information with them using deep shooting. For example, people can carry a piece of a map or the information of a next meeting place so they do not need to look up the same information again.

Scenario 2: Sharing the Content or the State Generated on Mobiles to Desktops (Mobiles to Desktops)

People can generate information (e.g. photos, contacts, or unfinished readings) on mobile devices. People can use particular software to synchronize a mobile device with a desktop device. In some cases, a cable and a full synchronizing process may be needed in order to display a single photo on a large display or to open a web page on the desktop device that is already opened on the mobile device. Deep posting can be a less cumbersome way to share this type of information between mobile devices and desktops.

Scenario 3: Using Mobiles as Temporary Storage (Desktops to Desktops Via Mobiles)

USB sticks (USB flash drives) can be used to share files among computers. People can save the information they need to share as files, copy the files onto the USB stick, and then take the USB stick to another computer. In this type of scenario, deep shooting can be used to extract information automatically from an application running on a computer (e.g., a desktop computer) to a mobile device. The mobile device can be taken to another place, and then the user can post the extracted information to another computer (e.g., another desktop computer) with deep posting.

Scenario 4: Sharing the Content or the State on One Mobile Device with Another Mobile (Mobiles to Mobiles)

Information can be shared between multiple personal mobile devices. In addition, information can be shared from one person's mobile device to another person's mobile device. For example, bumping is a synchronous gesture to connect two mobile devices. Although the current Deep Shot framework does not support communication between multiple users' devices, deep shooting and deep posting can be used to locate another device belonging to a user. In addition, deep shooting and deep posting can be used to locate the region of information to share between multiple users. For example, a user can take a picture of a contact displayed on another person's mobile device with deep shooting using his or her mobile device, and then the contact information can be automatically transferred to the user's mobile device.

Scenario 5: Continued Videogame Game Play

The techniques discussed here may be used to provide continuous game play of a video game by a single player, such as through a long-running game campaign. When the player is at home, he can play on a full-featured gaming console. When he goes to work, he can pause the gameplay and take a picture of his television screen with a smartphone. The console may then receive the image, determine that it is the relevant recipient, and send game status information to the smartphone. The user may then pick up the game on the smartphone where he left off, though at lower resolution and perhaps with certain additional limits on the gameplay functionality. The user can perform the inverse process when he returns home.

Figure 7:
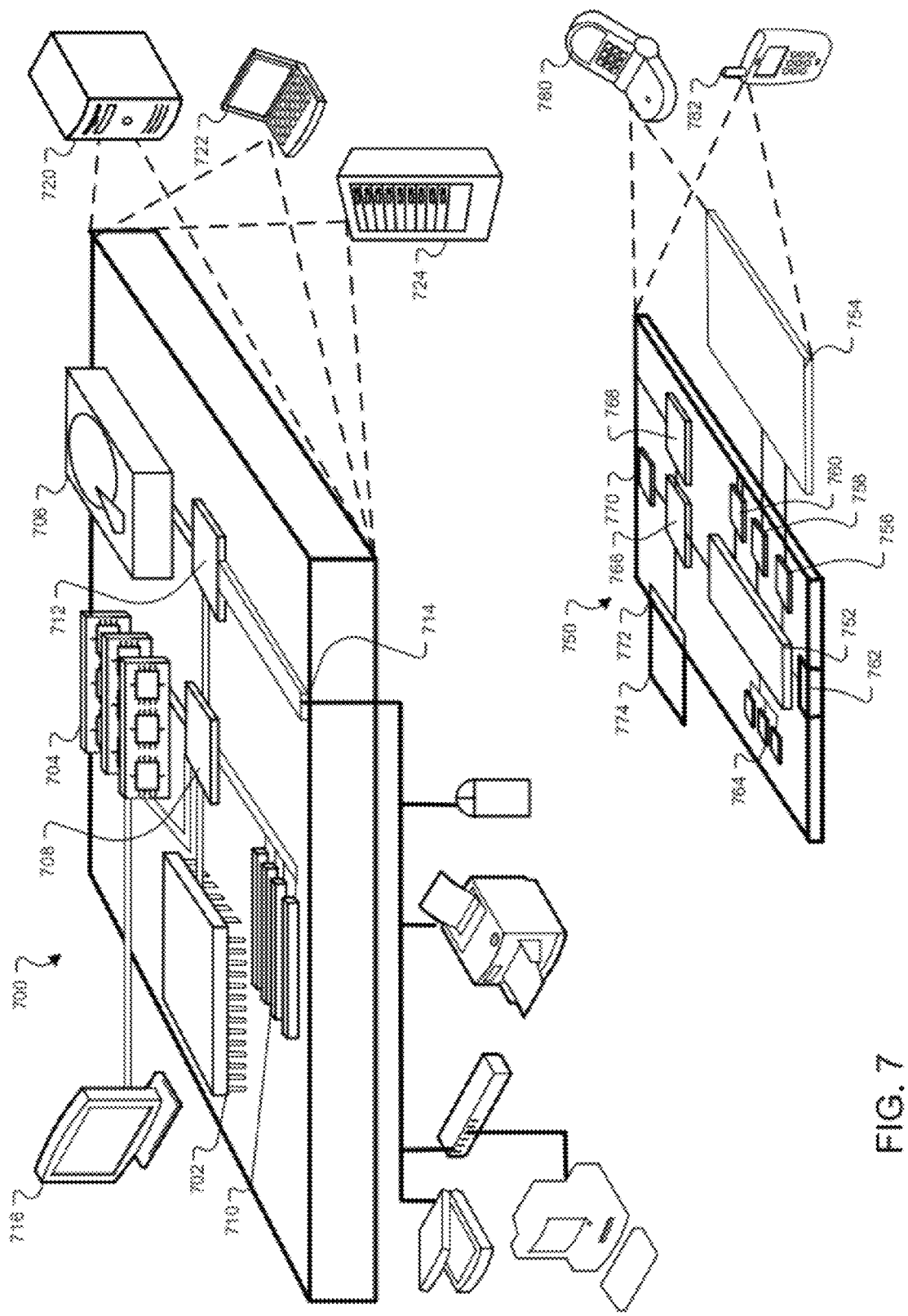
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interface may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, various forms of the flows shown above may be used, with steps re-ordered, added, or removed. Also, although several applications of the certification systems and methods have been described, it should be recognized that numerous other applications are contemplated. Accordingly, other implementations are within the scope of the following claims.

What is claimed is:

1. A computer implemented method, performed on a first computing device, the method comprising:
   receiving, by the first computing device, digital image data that corresponds to a digital image captured by a second computing device and sent to the first computing device by the second computing device;
   determining, based on analysis of the digital image data, that the digital image matches a current or recent display of the first computing device;
   receiving, by the first computing device, confirmation from a first user to provide state information for the first computing device to the second computing device;
   providing, by the first computing device based on receiving the confirmation from the first user, the state information for the first computing device to the second computing device, that state information being sufficient for the second computing device to place an application on the second computing device into a state that matches a state of a corresponding application on the first computing device.

2. The computer-implemented method of claim 1, wherein the first user and a second user, who corresponds to the second computing device, are members of a common trusted group managed by a server system.

3. The computer-implemented method of claim 1, wherein determining that the digital image matches a current display of the first computing device further comprises generating, by the first computing device, a signal indicating that relevant information has been received by the first computing device.

4. The computer-implemented method of claim 1, wherein receiving, by the first computing device, confirmation from the first user to provide state information for the first computing device to the second computing device further comprises receiving from the second computing device (i) an identity of a second user, who corresponds to the second computing device, and (ii) the identification of the state information.

5. The computer-implemented method of claim 1, further comprising:

capturing an image by the first computing device and sending the image to another computing device with a request to obtain information that identifies a current state of the other computing device.

6. The computer-implemented method of claim 1, wherein determining that the digital image matches a current display of the first computing device comprises determining coordinates of a region that matches between the current display and the captured image.

7. The computer-implemented method of claim 6, further comprising:

providing, by the first computing device to the second computing device and based on receiving the confirmation from the first user, the coordinates of the matched region and metadata that is selectable using an input device included on the second computing device.

8. The computer-implemented method of claim 7, wherein the data provided to the second computing device is arranged so that the second computing device can use the coordinates of the matched region to display the matched region on a display of the second computing device.

9. A computer-implemented system for moving information between computing devices, the system comprising:

a first computing device arranged to present one or more applications on a display screen; and a messaging interface on the first computing device to communicate messages through a network to one or more second computing devices, wherein the first computing device is programmed with an information sharing application to:

receive, from one of the one or more second computing devices, information that represents an image captured by a camera of the one of the one or more second computing devices;

determine, based on analysis of the received information, whether the captured image matches content displayed on the first computing device; and provide, to the one of the one or more second computing devices, state information that describes a state of one of the one or more applications.

10. The computer-implemented system of claim 9, wherein the information sharing application is further programmed to provide the state information only after obtaining consent from a user of the first computing device.

11. The computer-implemented system of claim 9, further comprising a camera on the first computing device, and wherein the information sharing application is programmed to send information about images captured by the camera to one of the one or more second computing devices, and to use information returned from the one of the one or more computing devices in order to place an application on the first computing device into a state that matches a state of an application executing on the one of the one or more computing devices.

12. The computer-implemented system of claim 9, wherein the information sharing application is further programmed to determine the captured image matches content displayed on the first computing device by determining coordinates of a region that matches between the content displayed on the first computing device and the captured image.

13. The computer-implemented system of claim 12, wherein the information sharing application is further programmed to provide the coordinates of the matched region and metadata that is selectable using an input device included on the one of the one or more second computing devices only after obtaining consent from a user of the first computing device.

14. The computer-implemented system of claim 13, wherein the information that represents the image captured by the camera of the one of the one or more second computing devices is arranged so that the one of the one or more second computing devices can use the coordinates of the matched region to display the matched region on a display of the one of the one or more second computing devices.

15. One or more computer-readable storage devices storing instructions that, when executed by one or more processors, perform operations comprising:

receiving, by a first computing device, digital image data that corresponds to a digital image captured by a second computing device and sent to the first computing device by the second computing device;

determining, based on analysis of the digital image data, that the digital image matches a current or recent display of the first computing device;

receiving, by the first computing device, confirmation from a first user to provide state information for the first computing device to the second computing device;

providing, by the first computing device based on receiving the confirmation from the first user, the state information for the first computing device to the second computing device, that state information being sufficient for the second computing device to place an application on the second computing device into a state that matches a state of a corresponding application on the first computing device.

16. The computer-readable storage devices of claim 15, wherein the first user and a second user who corresponds to the second computing device are members of a common trusted group managed by a server system.

17. The computer-readable storage devices of claim 15, wherein the operation of determining that the digital image matches a current display of the first computing device further comprises generating, by the first computing device, a signal indicating that relevant information has been received by the first computing device.

18. The computer-readable storage devices of claim 15, wherein the operation of receiving, by the first computing device, confirmation from the first user to provide state information for the first computing device to the second computing device further comprises receiving from the second computing device (i) an identity of a second user who corresponds to the second computing device, and (ii) the identification of the state information.

19. The computer-readable storage devices of claim 15, wherein the operations further comprise:

capturing an image by the first computing device and sending the image to another computing device with a request to obtain information that identifies a current state of the other computing device.

20. The computer-readable storage media of claim 15, wherein the operation of determining that the digital image matches a current display of the first computing device further comprises determining coordinates of a region that matches between the current display and the captured image.

21. The computer-readable storage devices of claim 20, wherein the operations further comprise:
    providing, by the first computing device to the second computing device and based on receiving the confirmation from the first user, the coordinates of the matched region and metadata that is selectable using an input device included on the second computing device.

22. The computer-readable storage devices of claim 21, wherein the data provided to the second computing device is arranged so that the second computing device can use the coordinates of the matched region to display the matched region on a display of the second computing device.

* * * * *

UNITED STATES PATENT AND TRADEMARK OFFICE
CERTIFICATE OF CORRECTION

PATENT NO. : 8,805,089 B2
APPLICATION NO. : 13/234953
DATED : August 12, 2014
INVENTOR(S) : Tsung-Hsiang Chang and Yang Li Page 1 of 1

It is certified that error appears in the above-identified patent and that said Letters Patent is hereby corrected as shown below:

In the Claims:

Column 24, line 63, in Claim 20, delete "media" and insert -- devices --, therefor.

Signed and Sealed this
Twenty-first Day of October, 2014

Michelle K. Lee
*Deputy Director of the United States Patent and Trademark Office*